United States Patent

Shiki et al.

[11] Patent Number: 4,579,194
[45] Date of Patent: Apr. 1, 1986

[54] MUFFLER WITH CATALYST FOR INTERNAL COMBUSTION ENGINE

[75] Inventors: Akira Shiki, Tachikawa; Masaru Nakano, Sayama; Hideki Nakazima, Saitama, all of Japan

[73] Assignees: Nissan Motor Co., Ltd., Yokohama; Kabushiki Kaisha Tsuchiya Seisakusho, Tokyo, both of Japan

[21] Appl. No.: 705,925

[22] Filed: Feb. 26, 1985

[30] Foreign Application Priority Data

Mar. 1, 1984 [JP] Japan ................................ 59-39044

[51] Int. Cl.⁴ ........................... F01N 1/14; F01N 3/15
[52] U.S. Cl. .................................. 181/231; 181/256; 181/262; 181/265; 181/272
[58] Field of Search ............... 181/231, 252, 256, 259, 181/262, 272

[56] References Cited

U.S. PATENT DOCUMENTS

| | | | |
|---|---|---|---|
| 2,482,987 | 9/1949 | De N. McCollum | 181/231 X |
| 3,038,552 | 6/1962 | Hedblom | 181/262 |
| 3,061,416 | 10/1962 | Kazokas | 181/231 X |
| 3,471,265 | 10/1969 | Ciapetta et al. | 181/249 X |
| 4,050,903 | 9/1977 | Bailey et al. | 181/259 X |
| 4,124,091 | 11/1978 | Mizusawa | 181/231 |

FOREIGN PATENT DOCUMENTS 55-34289 9/1980 Japan .

Primary Examiner—Benjamin R. Fuller
Attorney, Agent, or Firm—Leydig, Voit & Mayer, Ltd.

[57] ABSTRACT

A muffler for internal combustion engine houses a catalyst for exhaust gas purification and is provided with an exhaust gas inlet pipe through which exhaust gas from the engine is fed to the upstream side of the catalyst. The exhaust gas inlet pipe includes an inlet pipe section provided therein with a venturi section through which atmospheric air as secondary air is inducted into the exhaust gas inlet pipe. The inlet pipe section is extended in the direction of exhaust gas flow to form an extension pipe section which has a length of at least two times the inner diameter of the extension pipe section, thereby suppressing cutoff frequency at lower levels.

15 Claims, 4 Drawing Figures

MUFFLER WITH CATALYST FOR INTERNAL COMBUSTION ENGINE

BACKGROUND OF THE INVENTION

1. Field of the Invention

This invention relates in general to an improvement in a muffler provided with a catalyst, for an internal combustion engine, and more particularly to an improvement of an exhaust gas inlet pipe of such a muffler which pipe is provided therein with a venturi section for inducting secondary air under exhaust pulsation.

2. Description of the Prior Art

In connection with industrial trucks such as forklift trucks which are relatively small in size, a muffler for exhaust noise attenuation is frequently used in combination with a catalytic converter in order to reduce the length of an exhaust system. From this view point, a muffler provided therein with a catalyst has been proposed to achieve both noise attenuation and catalytic purification of exhaust gas. The muffler has an exhaust gas inlet pipe through which exhaust gas discharged from an internal combustion engine is fed into the muffler. The exhaust gas inlet pipe is provided with a venturi section through which atmospheric air as a secondary air is inducted into the muffler under the action of exhaust pulsation.

However, in such a muffler configuration, the exhaust gas inlet pipe is considerably short so that the distance between the venturi section and the rear open end of the inlet pipe is very small. Consequently, reflected wave of exhaust pulsation in such a short exhaust gas inlet pipe acts as interference wave on pulsation vacuum at the venturi section without being attenuated, thereby reducing the amount of secondary air to be inducted through the venturi section. This is caused even in a high frequency range of exhaust pulsation.

A problem of secondary air amount reduction is conspicuous particularly in the high frequency range of exhaust pulsation or in a high engine speed range. This is because, in addition to the above, atmospheric air or secondary air is naturally difficult to be inducted in such a range for the reason that the atmospheric air having a considerable inertia cannot follow momentary exhaust pulsation at the venturi section.

In order to solve the above-mentioned problem, it may be otherwise proposed to employ other secondary air induction device such as an air pump in place of a venturi system having the venturi section as in automotive vehicles. However, employing such secondary air induction device increases the number of parts while raising production cost of the exhaust system.

SUMMARY OF THE INVENTION

A muffler of the present invention houses a catalyst in its casing provided with an exhaust gas inlet pipe through which exhaust gas discharged from an internal combustion engine is fed to the upstream side of the catalyst. The exhaust gas inlet pipe includes an inlet pipe section provided therein with a venturi section through which secondary air is introduced into the exhaust gas inlet pipe. Additionally, the inlet pipe section is extended along the direction of exhaust gas stream to form an extension pipe section having a length of at least two times the inner diameter of the extension pipe section.

By virtue of the thus configured exhaust gas inlet pipe, cutoff frequency due to attenuation of the above-discussed reflected wave can be suppressed at lower levels, thereby obtaining a sufficient amount of secondary air throughout substantially the whole engine operating ranges without deterioration of exhaust noise silencing effect. Additionally, since a venturi system is used as a secondary air supply device, the production cost of the muffler is suppressed lower.

BRIEF DESCRIPTION OF THE DRAWINGS

The features and advantages of the muffler according to the present invention will be more clearly appreciated from the following description taken in conjunction with the accompanying drawings in which same reference numerals designate same elements and parts, and in which.

DETAILED DESCRIPTION OF THE INVENTION

Figure 1:
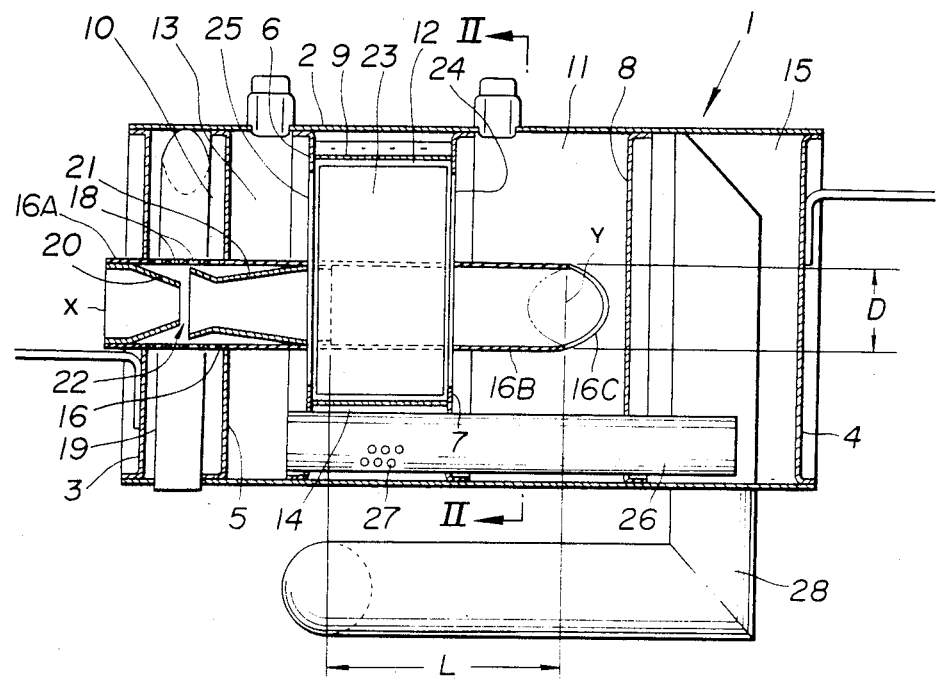
FIG. 1 is a longitudinal sectional view of a preferred embodiment of the muffler according to the present invention, the sectional view being taken in the direction of arrows substantially along the line I—I of FIG. 2.
Figure 2:
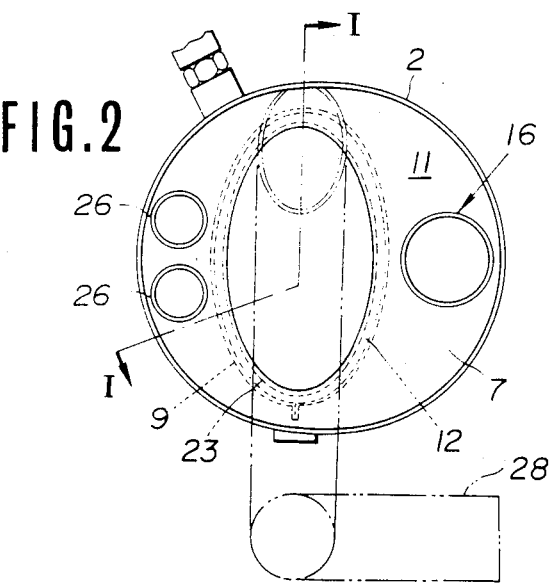
FIG. 2 is a sectional view taken in the direction of arrows substantially along the line II—II of FIG. 1.

Referring now to FIGS. 1 and 2, there is shown a preferred embodiment of a muffler 1 for an internal combustion engine, in accordance with the present invention. The muffler 1 of this instance is configured to be suitable for use in an industrial truck such as a forklift truck. The muffler 1 comprises a casing (no numeral) consisting of an outer cylindrical member 2 which is closed at its opposite ends with front and rear closure plates 3, 4 defining therein an inside space (no numeral). Additionally, four partition plates 5, 6, 7, 8 are fixed to the inner surface of the outer cylindrical member 2 in such a manner as to be parallelly and spacedly aligned. An inner cylindrical member 9 having an elliptical cross-section is fixedly interposed between the partition plates 6 and 7 in such a manner that its axis is parallel with the axis of the outer cylindrical member 2.

A chamber 10 is defined between the front closure plate 3 and the partition plate 5. A chamber 11 is defined between the partition plates 7, 8. A chamber 12 is defined within the inner cylindrical member 9. A chamber 13 is defined between the partition plates 5, 6. A chamber 14 is defined between the outer and inner cylindrical members 2, 9. A chamber is defined between the partition plate 8 and the rear closure plate 4.

An exhaust gas inlet pipe 16 is disposed within the casing is such a manner as to pierce the front closure plate 3, and the partition plates 5, 6, 7. The exhaust gas inlet pipe 16 extends through the chambers 10, 13, 14 to the chamber 11, so that exhaust gas discharged from the internal combustion engine is introduced into the chamber 11. The axis of the exhaust gas inlet pipe 16 is parallel with that of the outer cylindrical member 2 and the casing. The exhaust gas inlet pipe 16 includes an inlet pipe section 16A, and an extension pipe section 16B which is integral with the inlet pipe section 16A. The inlet pipe section 16A is formed with a plurality of small openings 18 located in the chamber 10. As shown, a secondary air introduction pipe 19 is disposed within the chamber 10, and has an inet end (no numeral)

opened to atmospheric air and an outlet end (no numeral) opened to the chamber 10.

Two tapered or venturi pipes 20, 21 are fixedly disposed within the inlet pipe section 16A of the exhaust gas inlet pipe 16. The two tapered pipes 20, 21 are located so that the smaller diameter open ends thereof face each other, thereby defining a venturi section 22. It is to be noted that the small diameter open ends of the two tapered pipes 20, 21 are separate from each other to define therebetween a space S. It will be understood that the space S of the venturi section 22 is communicated through the small openings 18 with the chamber 10 and accordingly with the secondary air introduction pipe 19.

The extension pipe section 16B of the exhaust gas inlet pipe 16 has an inner diameter the same as that of the inlet pipe section 16A and is arranged so that its axis is aligned with that of the inlet pipe section 16A. The extension pipe section 16B is formed with an outlet end opened to the chamber 11, so that exhaust gas introduced into the extension pipe section 16B is discharged through the outlet end 16C into the chamber 11. The outlet end 16C is of the shape formed by being obliquely cut out so that the plane of the opening of the outlet end 16C is inclined relative to an imaginary plate to which the axis of the extension pipe section 16B is perpendicular. It is to be noted that the length L of the extension pipe section 16B is not less than two times the inner diameter D of the extension pipe section 16B and of the exhaust gas inlet pipe 16. More specifically, the length L is a distance between a rearmost end of the venturi tube 21 and a center of the inclined plane of the opening of the outlet end 16C of the extension pipe section 16B.

A honeycomb type monolithic catalyst 23 is securely disposed within the chamber 12 and functions to convert noxious components of exhaust gas into harmless gases. The honeycomb type catalyst 23 has a gas inlet face (no numeral) adjacent the partition plate 7, and a gas outlet face adjacent the partition plate 6. In this connection, the partition plate 7 is formed with a gas inlet opening 24 through which exhaust gas is introduced to the catalyst 23, whereas the partition plate 6 is formed with a gas outlet opening 25 through which exhaust gas passed through the catalyst 23 is introduced into the chamber 13.

A communicating tube 26 is securely disposed within the casing in such a manner as to pierce the partition plates 6, 7, 8. The communicating tube 26 has an inlet open end (no numeral) located within the chamber 13, and an outlet open end located within the chamber 15, so that exhaust gas in the chamber 13 is fed through the communicating tube 26 to the chamber 15. Additionally, the communicating tube 26 is formed with a plurality of small openings 27 located within the chamber 14, so that the inside of the communicating tube 26 is also communicated with the chamber 14. As shown, an exhaust gas outlet pipe 28 is securely connected to the casing in such a manner that one open end thereof is opened to the chamber 15 whereas the other open end is opened to atmospheric air.

The manner of operation of the thus configured muffler 1 will be discussed hereinafter.

Exhaust gas discharged from the engine flows through the exhaust gas inlet pipe 16 in which secondary air or atmospheric air is sucked through the venturi section 22 into the exhaust gas inlet pipe 16 under so-called aspirator action of the venturi section 22 so that the secondary air is mixed with exhaust gas flowing through the exhaust gas inlet pipe 16. Then, the exhaust gas mixed with the secondary air flows through the extension pipe section 16B into a first reversal and supply chamber 11 which provides means for reversing the direction of flow of the air/gas mixture so that it is introduced into the honeycomb type catalyst 23 through the partition plate gas inlet opening 24, so that the noxious components of the exhaust gas are converted into harmless gases. Thereafter, the exhaust gas flows through the partition plate gas outlet opening 25 into a second reversal and supply chamber 4, which provides a second means for reversing the direction of flow of the air/gas mixture so that it returns to the original direction and is fed to the chamber 15 via the communicating tube 26. A part of the exhaust gas flowing through the communicating tube 26 leaks through small openings 27 into the chamber 14 which is so located as to surround the catalyst 23. It will be understood that, since the chamber 14 is supplied with the exhaust gas whose temperature is raised upon passing through the catalyst 23, the warming effect to the catalyst 23 can be improved thereby effectively activating the catalyst even at engine idling. The exhaust gas fed to the chamber 15 is discharged through the exhaust gas outlet pipe 28 into atmospheric air.

During the passage of the exhaust gas through the first reversal and supply chamber 11, the catalyst 23, the second reversal and supply chamber 13, the communicating tube 26, and the chamber 15, silencing or noise attenuation of the exhaust gas can be achieved under expansion and contraction of the gas. In addition, the chamber 14 communicated with communicating tube 26 serves as a resonator, thereby attenuating exhaust noise in a predetermined frequency range.

Now, the exhaust gas flowing through the exhaust gas inlet pipe 16 has a periodic variation in flow velocity (due to exhaust pulsation) caused by operation of exhaust valves (not shown) of the engine. This flow velocity variation is enlarged by the venturi section 22 and maintained to the position of the outlet end 16C of the exhaust gas inlet pipe 16, and then advances in the reverse direction of exhaust gas stream as reflected wave upon being changed 180 degrees in phase, thus acting as interference wave on vacuum generated in the venturi section 20. It will be understood that it is possible to make the phases of the reflected wave and pulsation wave (the flow velocity variation) in agreement with each other at a certain engine speed thereby to avoid interference therebetween. However, interference therebetween unavoidably occurs at engine speeds other than the above-mentioned certain engine speed, so that the reflected wave substantially serves as interference wave in practice. Additionally, it has been observed that secondary air is difficult to be sucked through the venturi section under momentary pulsation because secondary air or sucked air has a relatively high inertia in a high frequency range of exhaust pulsation (or in a high engine speed range).

In view of the above facts, the muffler 1 of the above-mentioned embodiment is so configured as to make the length L of the extension pipe section 16B of the exhaust gas inlet pipe 16 as long as possible thereby to restrict the influence of the above-mentioned interference wave within a low frequency range of the exhaust pulsation, thus obtaining a sufficient amount of secondary air throughout substantially all engine operating ranges.

More specifically, if the length L of the extension pipe section 16B is shorter, cutoff frequency due to attenuation of the reflected wave is higher, so that the introduction amount of secondary air becomes insufficient with the assistance of the inertia of atmospheric air. In contrast with this, with the muffler of this embodiment, the length L of the extension pipe section 16B is considerably large, and therefore cutoff frequency due to attenuation of the reflected wave can be suppressed at lower levels. Consequently, the reflected wave can be prevented from serving as interference wave against the pulsation wave at a high frequency range of exhaust pulsation, thereby effectively accomplishing secondary air suction due to vacuum fractions of exhaust pulsation throughout substantially whole engine operating ranges. This makes possible to obtain a sufficient amount of secondary air to be added to the exhaust gas flowing through the exhaust gas inlet pipe 16.

Figure 3A:
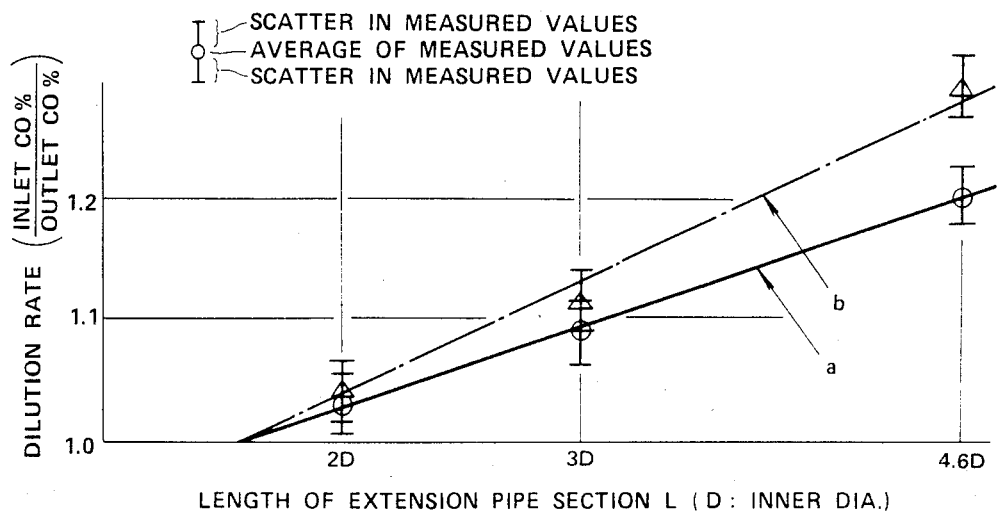
FIGS. 3A and 3B are graphs showing experimental data on which the length of an exhaust gas inlet pipe of the muffler of the present invention is selected.
Figure 3B:
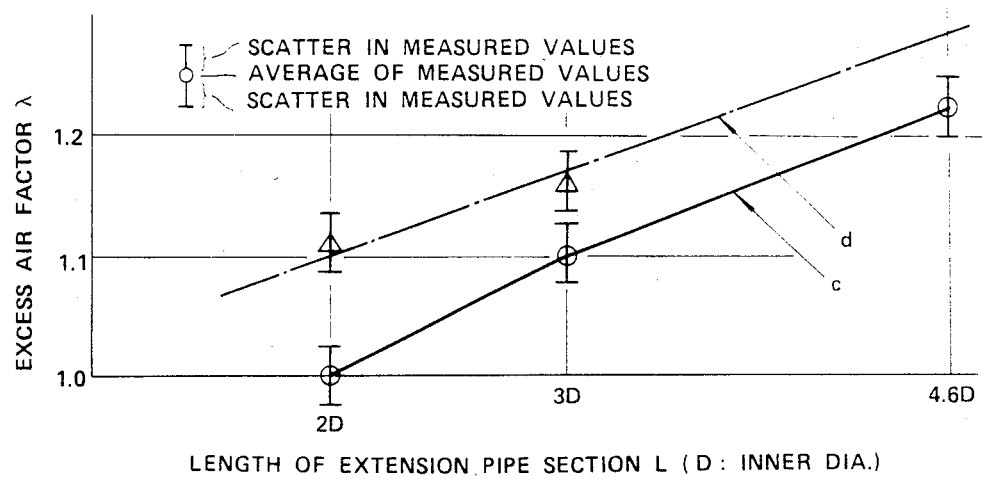

It is to be noted that it was confirmed from the experimental data of FIGS. 3A and 3B, that the length L of the extension pipe section 16B of the exhaust gas inlet pipe 16 was necessary to be not less than two times the diameter D of the extension pipe section 16B. The measurement of the experimental data was conducted upon altering the length of the extension pipe section 16B, using a four-cylinder internal combustion engine (having a displacement of 2000 cc) provided with a muffler having a construction same as in FIG. 1 in which the inner diameter D of the extension pipe section 16B is 42 mm.

The data of FIG. 3A relates to so-called "dilution rate (inlet CO percent/outlet CO percent)" which demonstrates secondary air introduction promoting effect by the extension pipe section, in which the inlet CO percent was measured at a position X (shown in FIG. 1) whereas the outlet CO percent was measured at a position of Y (shown in FIG. 1). The graph of FIG. 3A was obtained on the measurement at an engine speed of 2000 rpm, in which a line a indicates the data at ¼ load whereas a line b indicates the data at 4/4 load.

The data of FIG. 3B relates to so-called "excess air factor λ (the amount of oxygen contained in exhaust gas/the theoretical amount of oxygen required to completely oxidize unburnt combustible components in the exhaust gas)" which also demonstrates secondary air introduction promoting effect by the extension pipe section, in which the amount (ppm) of oxygen was measured at the position Y (shown in FIG. 1). The graph of FIG. 3B was obtained on the measurement at an engine speed of 2400 rpm, in which a line c indicates the data at ¼ load whereas a line d indicates the data a 4/4 load.

Furthermore, since the outlet end 16C of the exhaust gas inlet pipe 16 is of such a shape as to be formed by being obliquely cut out, exhaust gas stream can be readily released into the second chamber 12, so that it is possible to suppress, to a lower level, pressure loss due to collision and turbulence generation of gas as compared with a case an outlet end of an exhaust gas inlet pipe has a normally cylindrical shape, thus further improving secondary air introduction into the exhaust gas inlet pipe.

What is claimed is:

1. A muffler for an internal combustion engine comprising:
 a casing;
 a catalyst disposed within said casing to convert noxious components of exhaust gas received from the engine at an upstream side of the catalyst into harmless gases at a downstream side;
 an exhaust gas inlet pipe including an inlet pipe section having a venturi section means for introducing secondary air into said exhaust gas inlet pipe to mix with exhaust gas, and an extension pipe section coaxially connected with said inlet pipe section and extended downstream of said venturi section means for conveying the mixture of exhaust gas and secondary air in an original direction through the casing, said extension pipe section having a length of at least two times the inner diameter of said extension pipe section;
 first flow reversal and supply means for reversing the direction of flow of the mixture of exhaust gas and secondary air received from said extension pipe and supplying the mixture to the upstream side of said catalyst,
 second flow reversal and supply means at the downstream side of said catalyst for receiving and reversing the direction of flow of harmless gases to the original direction, and
 means communicating between said second flow reversal and supply means and the atmosphere for discharging the harmless gases.

2. A muffler as claimed in claim 1 wherein said casing is elongated and said exhaust gas inlet pipe, including said extension pipe section, is located within said casing and has an axis extending longitudinally of said casing.

3. A muffler as claimed in claim 2 wherein said inlet pipe section and said extension pipe section have the same inner diameter, and are integrally connected with each other.

4. A muffler as claimed in claim 3 wherein said inlet pipe section and said extension pipe section are aligned with each other.

5. A muffler as claimed in claim 2 wherein said venturi section means includes first and second tapered pipes, each of which has first and second ends, the second end having an opening larger than that of the first end, said first and second tapered pipes being located so that their first ends face each other, defining therebetween a space through which secondary air is introduced into said exhaust gas inlet pipe, said first tapered pipe being positioned upstream of said second tapered pipe.

6. A muffler as claimed in claim 5 wherein said extension pipe section of said exhaust gas inlet pipe is extended from the second end of said second tapered pipe.

7. A muffler as claimed in claim 2 wherein said extension pipe section of said exhaust gas inlet pipe has an outlet end formed with an opening to a first reversal and supply chamber and defined by a plane inclined relative to the axis of said extension pipe section of said gas inlet pipe.

8. A muffler as claimed in claim 2 wherein said exhaust gas inlet pipe is such located that the axis thereof is parallel with the axis of said casing.

9. A muffler as claimed in claim 2 said communicating means comprising a communicating tube having a first open end opened to a second reversal and supply chamber at the downstream side of said catalyst and a second open end through which the harmless gases are discharged.

10. A muffler as claimed in claim 1 wherein said casing is elongated and includes a front and a rear closure plate, four transverse longitudinally-spaced internal partition plates and a longitudinally-extending cylindrical partition plate between the second and third partition plates;

said venturi section means includes a secondary air chamber defined between said front closure plate and the first partition plate for supplying secondary air for aspirating into a venturi section of said inlet pipe section in response to pulsations of exhaust gas flowing through the venturi section so that secondary air is mixed with the exhaust gas, and secondary air supplying means in communication with the atmosphere for supplying atmospheric air to said secondary air chamber;

said first means for reversing direction of flow of air/gas mixture includes a first flow reversal and supply chamber defined between the third and fourth partition plates for reversing the direction of flow of exhaust gas and secondary air mixture received from the exhaust gas inlet pipe extension pipe section and supplying it to the upstream end of said catalyst;

said second and third partition plates and said cylindrical partition plate define catalyst-containing chamber means for said catalyst and for receiving the air/gas mixture from said first flow reversal and supply chamber at the upstream side of said catalyst and providing harmless gases at the downstream side;

said second means for reversing the direction of flow of harmless gases includes a second flow reversal and supply chamber defined between said first and second partition plates for reversing the direction of flow of harmless gases from the downstream side of said catalyst-containing chamber; and said communicating means includes a communicating tube for receiving harmless gases from said second flow reversal and supply chamber, a catalyst warming chamber means defined between said second and third partition and located outside of said cylindrical partition plate, said communicating tube having a perforated portion within said catalyst warming chamber means for circulating harmless gases from said perforated portion of said communicating tube through said warming chamber to warm said catalyst, and an exhaust gas exit chamber means defined between said rear closure plate and said fourth partition plate for receiving harmless gases from said communicating tube and discharging them to the atmosphere.

11. A muffler as claimed in claim 10 wherein said inlet pipe section of said exhaust gas inlet pipe is formed with a plurality of openings located within said secondary air chamber, said ventuiri section being communicated through said openings with said secondary air chamber.

12. A muffler as claimed in claim 10 wherein said communicating tube is located so that the axis thereof is parallel with the longitudinal axis of said casing.

13. A muffler as claimed in claim 12, wherein said cylindrical plate containing catalyst is located so that the axis thereof is parallel with the longitudinal axis of said casing.

14. A muffler as claimed in claim 10 wherein said first, second, third, and fourth partition plates are parallel with each other and located perpendicular to the longitudinal axis of said casing.

15. A muffler as claimed in claim 10 wherein said second partition plate is formed with an opening through which harmless gas from said catalyst flows into the second flow reversal and supply chamber, and said third partition plate is formed with an opening through which the exhaust gas and secondary air mixture in said first flow reversal and supply chamber flows into said catalyst.

* * * * *